(12) United States Patent
Masuda et al.

(10) Patent No.: US 11,290,442 B2
(45) Date of Patent: Mar. 29, 2022

(54) COMMUNICATION DEVICE, COMMUNICATION METHOD, AND COMPUTER PROGRAM

(71) Applicant: Panasonic Intellectual Property Management Co., Ltd., Osaka (JP)

(72) Inventors: Yoichi Masuda, Osaka (JP); Tomoki Takazoe, Kanagawa (JP)

(73) Assignee: Panasonic Intellectual Properly Management Co., Ltd., Osaka (JP)

(*) Notice: Subject to any disclaimer, the term of this patent is extended or adjusted under 35 U.S.C. 154(b) by 103 days.

(21) Appl. No.: 16/741,720

(22) Filed: Jan. 13, 2020

(65) Prior Publication Data
US 2020/0252390 A1    Aug. 6, 2020

(30) Foreign Application Priority Data

Feb. 4, 2019   (JP) .............................. JP2019-018116

(51) Int. Cl.
*H04L 29/06*    (2006.01)
(52) U.S. Cl.
CPC ...... *H04L 63/0823* (2013.01); *H04L 63/0876* (2013.01); *H04L 63/10* (2013.01); *H04L 63/20* (2013.01)

(58) Field of Classification Search
CPC ..... H04L 63/0823; H04L 63/10; H04L 63/20; H04L 63/0876; H04L 67/12; H04W 4/70; H04W 12/065
USPC ........................................................ 713/156
See application file for complete search history.

(56) References Cited

U.S. PATENT DOCUMENTS

| 10,542,466 | B1* | 1/2020 | Indurkar | H04W 36/0038 |
| 2016/0149890 | A1* | 5/2016 | Ujiie | H04L 63/101 |
| | | | | 726/3 |
| 2020/0008027 | A1* | 1/2020 | Yabuuchi | G08G 1/09 |
| 2020/0022072 | A1* | 1/2020 | Cho | G06T 7/70 |

FOREIGN PATENT DOCUMENTS

| JP | 2014-107637 A | 6/2014 |
| WO | 2017/208297 A1 | 12/2017 |

* cited by examiner

*Primary Examiner* — Tu T Nguyen
(74) *Attorney, Agent, or Firm* — McDermott Will & Emery LLP

(57) ABSTRACT

A HEMS controller receives, from each of a plurality of devices requesting registration in a HEMS, an electronic certificate of the device in a continuous registration mode in which a plurality of devices can be continuously registered in the HEMS. The HEMS controller 14 determines whether or not to permit registration in the HEMS for each device based on an attribute indicated by the electronic certificate of each of the plurality of devices.

9 Claims, 7 Drawing Sheets

COMMUNICATION DEVICE, COMMUNICATION METHOD, AND COMPUTER PROGRAM

BACKGROUND

1. Field of the Invention

The present disclosure relates to communication technology and, more particularly, to a communication device, a communication method, and a computer program.

2. Description of the Related Art

In recent years, it is envisaged that home energy management systems (HEMS) for managing energy used at home will be used popularly. An HEMS controller that manages the HEMS authenticates a device that requests registration in the HEMS, and when the device authentication is successful, permits the device to be accepted by the HEMS (see, for example, Patent Document 1). Also, a HEMS has been suggested that starts a new connection acceptance without transitioning to a connection non-acceptable state until a predetermined condition is satisfied even when connection setting with one device is completed (for example, Patent Document 2).

[Patent Document 1] Japanese Patent Application Publication No. 2014-107637

[Patent Document 2] International Publication No. 2017/208297

When receiving registration requests continuously from a plurality of devices, it is not preferable in terms of security to handle both a device with high reliability and a device with low reliability equally and register both devices continuously.

SUMMARY

In this background, a purpose of the present disclosure is to suppress a decrease in security when registration requests are received continuously from a plurality of devices.

A communication device according to one embodiment of the present disclosure is a communication device that manages a predetermined system, including: a reception unit that receives, from each of a plurality of devices requesting registration in the system, an electronic certificate of the device in a continuous registration mode in which a plurality of devices can be continuously registered in the system; and an authentication unit that determines whether or not to permit registration in the system for each device based on an attribute indicated by the electronic certificate of each of the plurality of devices.

Another embodiment of the present disclosure relates to a communication method. This method is executed by a communication device that manages a predetermined system and includes: receiving, from each of a plurality of devices requesting registration in the system, an electronic certificate of the device in a continuous registration mode in which a plurality of devices can be continuously registered in the system; and determining whether or not to permit registration in the system for each device based on an attribute indicated by the electronic certificate of each of the plurality of devices.

Optional combinations of the aforementioned constituting elements, and implementations of the disclosure in the form of systems, computer programs, recording mediums encoded with computer programs, etc., may also be practiced as additional modes of the present disclosure.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

The invention will now be described by reference to the preferred embodiments. This does not intend to limit the scope of the present invention, but to exemplify the invention.

The device or the entity that executes the method according to the present disclosure is provided with a computer. By causing the computer to run a program, the function of the device or the entity that executes the method according to the disclosure is realized. The computer includes a processor that operates in accordance with the program as a main hardware feature. The disclosure is non-limiting as to the type of the processor as long as the function can be realized by running the program. The processor is comprised of one or a plurality of electronic circuits including a semiconductor integrated circuit (IC) or a large-scale integration (LSI). Although the terms IC and LSI are used here, the name changes depending on the degree of integration, and those that are referred to as system LSI, VLSI (very large scale integration), or USLI (ultra large scale integration) may be used. Field programmable gate arrays (FPGAs) programmed after the manufacturing of an LSI, or reconfigurable logic devices capable of reconfiguring junction relationships within the LSI or setting up circuit partitions inside the LSI can be also used for the same purpose. The plurality of electronic circuits may be integrated in one chip or provided in a plurality of chips. The plurality of chips may be aggregated in one device or provided in a plurality of devices. The program is recorded in a non-transitory recording medium such as a computer-readable ROM, optical disk, and hard disk drive. The program may be stored in a recording medium in advance or supplied to a recording medium via wide area communication network including the Internet.

First Embodiment

Figure 1:
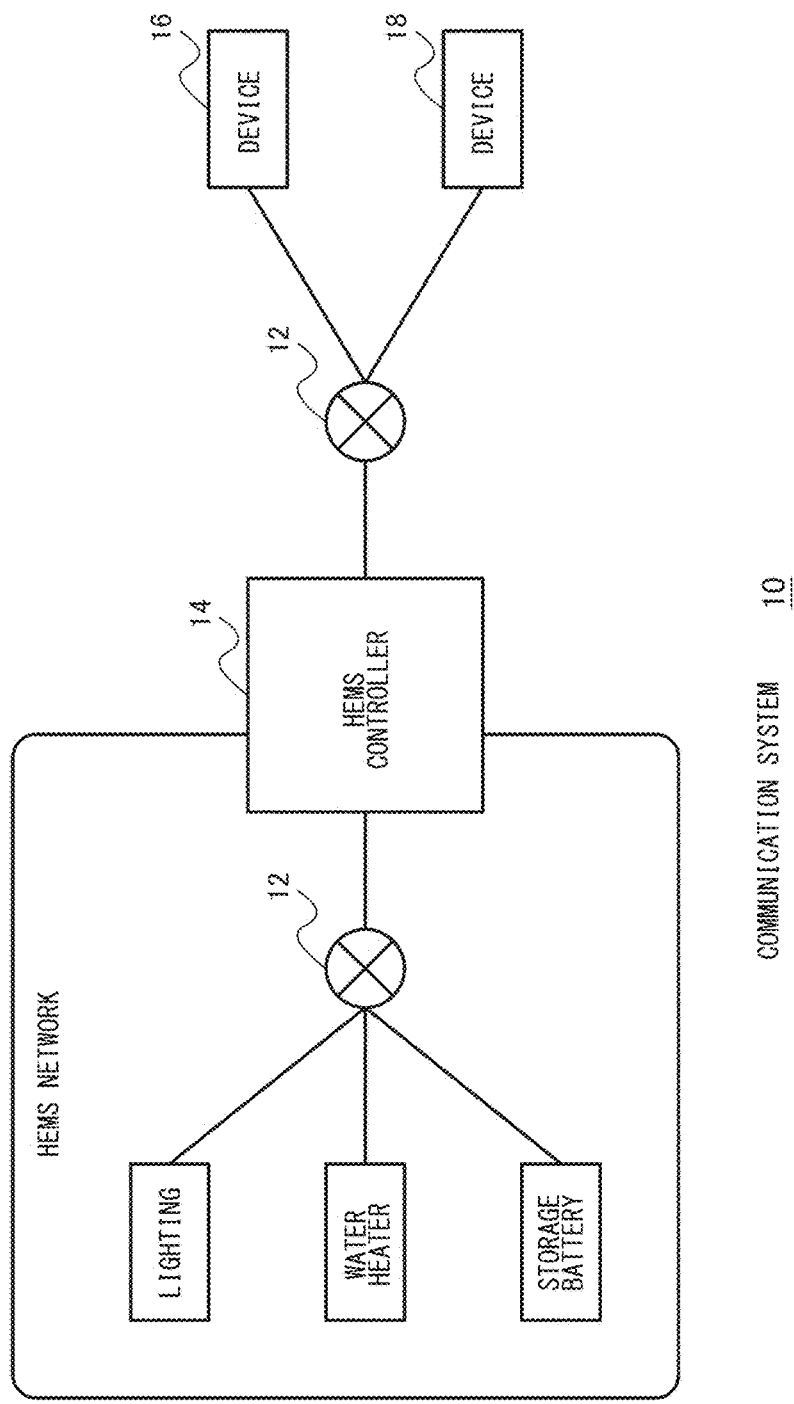
FIG. 1 shows a configuration of a communication system according to the first embodiment.

FIG. 1 shows a configuration of a communication system 10 according to the first embodiment. The communication system 10 includes a home network 12 built in a user's house. The home network 12 may be one of wired communication and wireless communication or a combination of both and may include, for example, Wi-Fi (registered trademark). A HEMS controller 14 is a communication device (in other words, an information processing device) that manages a HEMS in the user's house. Although not shown in FIG. 1, the HEMS controller 14 is also connected to a device (such as a server that provides various types of information) provided outside the house via the Internet or the like.

Devices registered in HEMS (in other words, participating in HEMS) include electrical equipment, home appliances, information devices, and sensors. Examples include lighting, water heaters, storage batteries, air conditioners, smart meters, and the like. Each device in the house is connected to the HEMS controller 14 via the home network 12 to form a HEMS network. In the HEMS network, secure communication is executed between the HEMS controller 14 and the device using a communication key shared at the time of authentication.

In HEMS, for example, the usage amount of electricity, gas, or the like is visualized on the screen of the user's smartphone, and automatic control and remote control of home appliances are realized. A device 16 and a device 18 in FIG. 1 are devices that request registration (in other words, participation) in the HEMS, as described later, and are, for example, air conditioners, smartphones, or the like.

As an operation mode at the time of registering a device in the HEMS, the HEMS controller 14 according to the embodiment includes a continuous registration mode in which a plurality of devices can be continuously registered. In the continuous registration mode, a plurality of devices are sequentially authenticated for a certain period from the start.

In order to realize flexible operation of the HEMS, it is assumed that an electronic certificate of a device that requests registration to the HEMS is not limited to an electronic certificate issued by a third party such as a certificate authority and that an electronic certificate issued by the manufacturer of the device or the device itself is used. In this case, in the continuous registration mode, it is not preferable in terms of security to treat a device with high reliability and a device with low reliability equally and register both devices continuously in the HEMS. Therefore, the HEMS controller 14 according to the embodiment determines whether or not to permit registration in the HEMS for each device based on the attribute indicated by an electronic certificate of each device.

Figure 2:
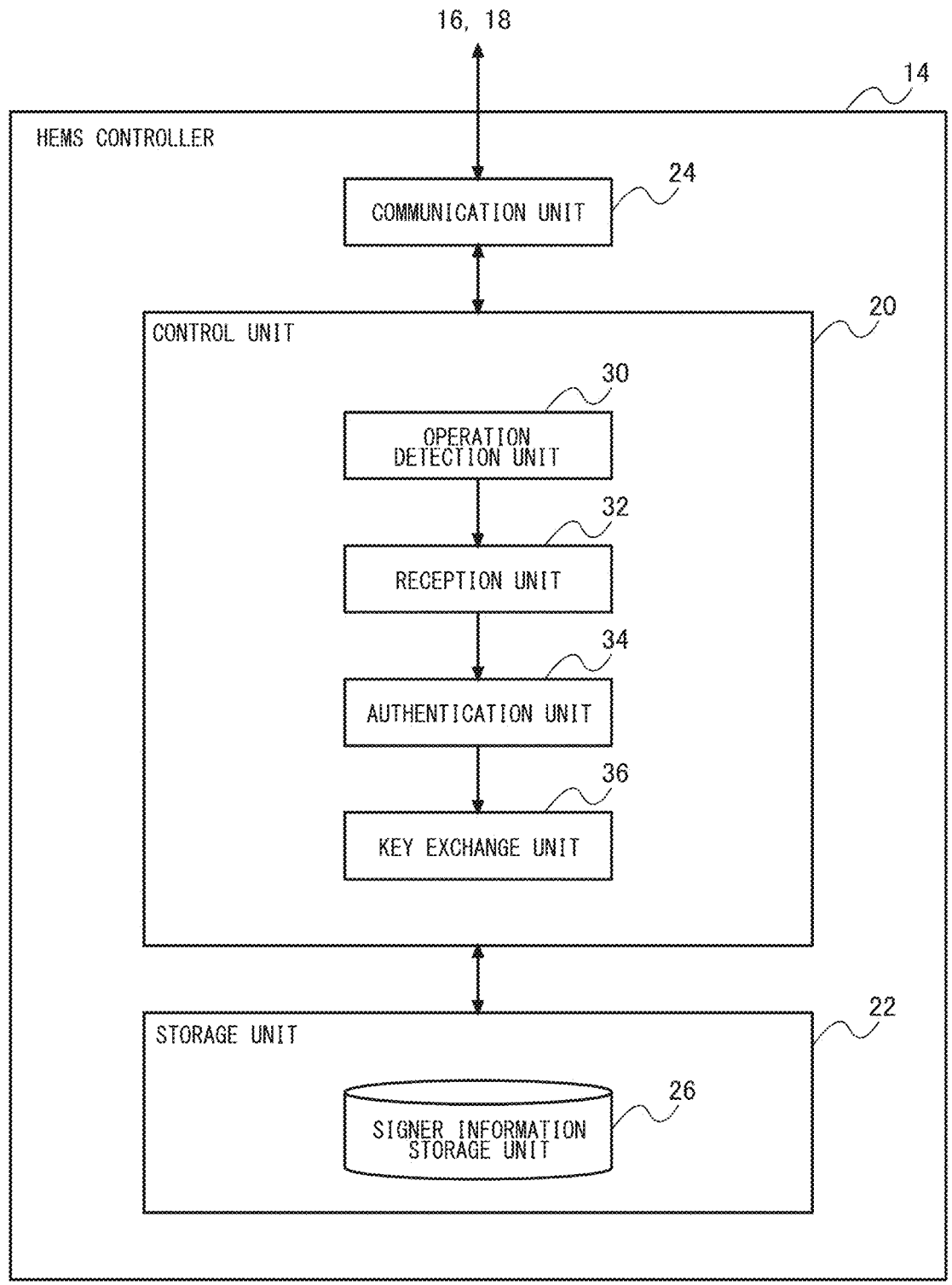
FIG. 2 is a block diagram showing functional blocks of a HEMS controller according to the first embodiment.

FIG. 2 is a block diagram showing functional blocks of the HEMS controller 14 according to the first embodiment. The blocks depicted in the block diagram of the present disclosure are implemented in hardware such as elements or mechanical devices such as a CPU and a memory of a computer, and in software such as a computer program. The figure depicts functional blocks implemented by the cooperation of these elements. Therefore, it will be obvious to those skilled in the art that the functional blocks may be implemented in a variety of manners by a combination of hardware and software.

The HEMS controller 14 includes a control unit 20, a storage unit 22, and a communication unit 24. The control unit 20 executes various types of data processing as a group manager of the HEMS. The storage unit 22 stores data that is referred to or updated by the control unit 20. The communication unit 24 communicates with an external device according to a predetermined communication protocol. For example, the control unit 20 transmits/receives data to/from the devices 16 and 18 via the communication unit 24.

The storage unit 22 includes a signer information storage unit 26. The signer information storage unit 26 stores information related to the reliability of a signer, which is one of the attributes of an electronic certificate (also referred to as a public key certificate). The signer is a subject (certificate authority, manufacturer, device, etc.) that has given the electronic signature and can be considered to be an issuer of the electronic certificate. In the embodiment, the signer information storage unit 26 stores a list indicating one or a plurality of signers that are recognized to have high reliability, in other words, a list (white list, so to speak) indicating one or a plurality of signers that are permitted to register (in other words, participate) in the HEMS.

The control unit 20 includes an operation detection unit 30, a reception unit 32, an authentication unit 34, and a key exchange unit 36. A computer program (for example, a group manager program) in which the functions of the plurality of functional blocks are mounted may be stored in a recording medium and installed in the storage unit 22 of the HEMS controller 14 via the recording medium. Alternatively, the computer program may be installed in the storage unit 22 via a communication network. The CPU of the HEMS controller 14 may exhibit the functions of the respective functional blocks by reading the computer program into the main memory and running the computer program.

The operation detection unit 30 detects a user operation that has been input to an operation unit (button or the like) provided in the HEMS controller 14. The operation detection unit 30 may detect a user operation (that is, a remote operation) that has been input through communication from a user's smartphone or the like.

Figure 3:
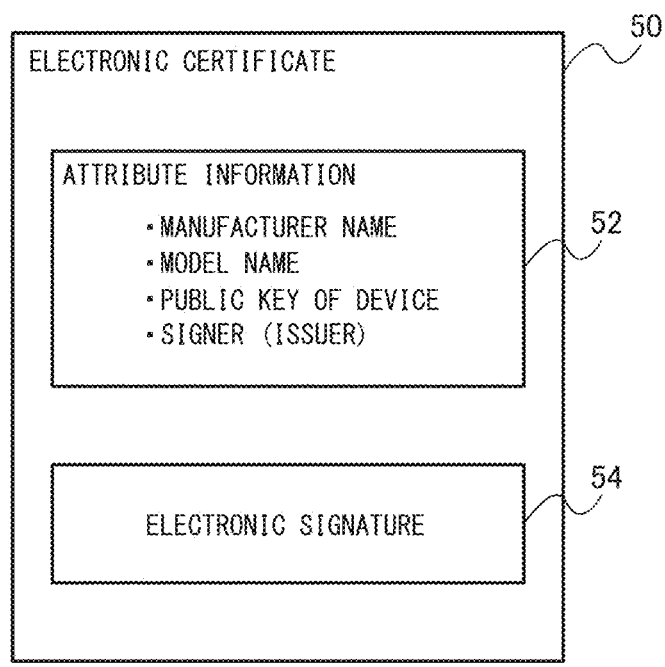
FIG. 3 is a diagram showing an example of an electronic certificate.

When the operation mode is the continuous registration mode, the reception unit 32 receives, from each of a plurality of devices requesting registration in the HEMS, an electronic certificate of the device. FIG. 3 shows an example of the electronic certificate. An electronic certificate 50 includes attribute information 52 and an electronic signature 54. The attribute information 52 indicates various attributes related to the device to which the electronic certificate is given or to the electronic certificate itself. The attribute information 52 includes data indicating the manufacturer name of the device, model name of the device, public key of the device, and signer (in other words, the issuer of the electronic certificate 50). The electronic signature 54 is data of a digital signature that uses a signer's private key.

Referring back to FIG. 2, the authentication unit 34 determines whether or not to permit registration in the HEMS for each device based on the attribute indicated by the electronic certificate of each of the plurality of devices. In the embodiment, the authentication unit 34 determines whether or not to permit registration in the HEMS in accordance with the reliability of the signer indicated by the electronic certificate of the device. As an exemplary variation, the authentication unit 34 may determine whether or not to permit registration in the HEMS based on an attribute that is different from the signer (for example, manufacturer name, model name, etc.) or based on the combination of the different attribute and the signer.

Further, within a predetermined period, the authentication unit 34 continues the continuous registration mode in a case where the registration of the first device in the HEMS is permitted based on the attribute indicated by the electronic certificate of the first device and in a case where the registration of the first device in the HEMS is rejected. That is, the authentication unit 34 determines whether or not to register the second device in the HEMS based on the attribute indicated by the electronic certificate of the second device different from the first device after permitting or rejecting the registration of the first device.

In the continuous registration mode, the authentication unit 34 determines whether or not to permit registration in the HEMS for each device in accordance with the reliability of a signer indicated by the electronic certificate of each of the plurality of devices. In the embodiment, when the signer indicated by the electronic certificate of the device is included in the list of signers stored in the signer information storage unit 26, the authentication unit 34 determines that the reliability of the signer (in other words, the reliability of the electronic certificate) is high and permits the registration of the device in the HEMS. On the other hand, when the signer indicated by the electronic certificate of the device is not included in the list of signers stored in the signer information storage unit 26, the authentication unit 34 determines that the reliability of the signer (in other words, the reliability of the electronic certificate) is low and rejects the registration of the device in the HEMS.

The key exchange unit 36 executes a process for sharing the same communication key (also referred to as a session key) with a device whose registration in the HEMS has been permitted by the authentication unit 34. For example, using a known encryption algorithm such as elliptic curve digital signature algorithm (ECDSA) or elliptic curve Diffie-Hellman key exchange (ECDH), the authentication unit 34 and the key exchange unit 36 may perform mutual authentication and key sharing. Alternatively, the key exchange unit 36 may generate a communication key for communication with a specific device, encrypt the communication key using the public key of the specific device, and transmit the encrypted data to the specific device. The specific device may acquire the communication key by decrypting the encrypted data using a private key of the device.

Figure 4:
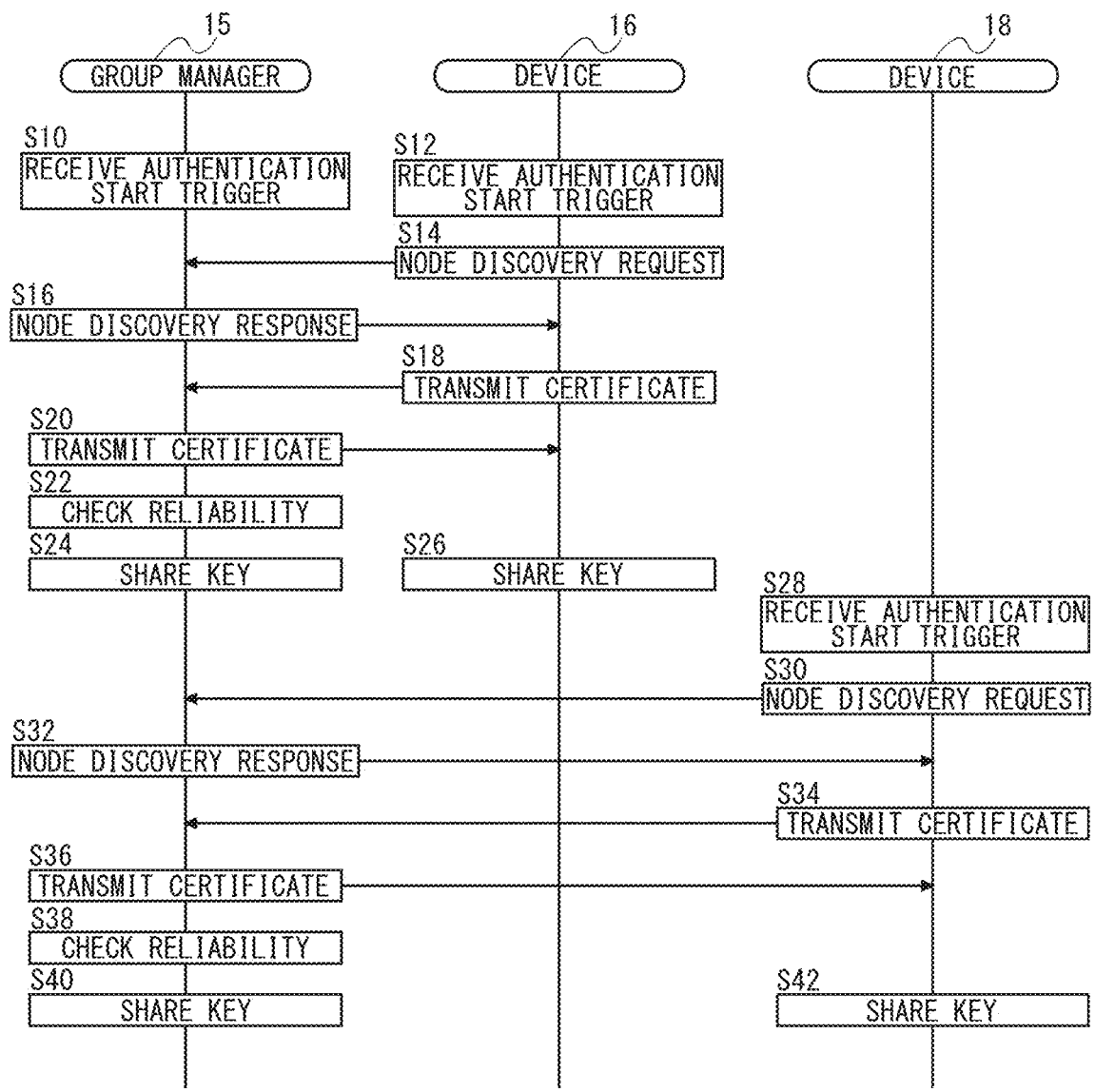
FIG. 4 is a flowchart showing the operation of the communication system according to the first embodiment.

A description will now be given of the operation of the communication system 10 having the configuration described above. FIG. 4 is a flowchart showing the operation of the communication system 10 according to the first embodiment. The operation of a group manager 15 shown in the figure is realized by executing a group manager program installed in the HEMS controller 14 in the embodiment. Therefore, the operation of the group manager 15 can be considered to be the operation of the HEMS controller 14. Further, the operation of the group manager 15 shown in the figure shows the operation in the continuous registration mode.

The user inputs operation (such as pressing a predetermined button) that triggers the start of authentication in the continuous registration mode to the group manager 15 (HEMS controller 14). The operation detection unit 30 of the group manager 15 (HEMS controller 14) detects the above user operation (S10). When the user operation is input, the reception unit 32 of the group manager 15 enters a state of waiting for reception of a signal for requesting discovery of a node (hereinafter also referred to as "discovery request signal").

The user inputs operation (such as pressing a predetermined button) that triggers the start of authentication to the device 16 (for example, an air conditioner) installed in the first room. The device 16 detects the above user operation (S12). The device 16 transmits a discovery request signal to the group manager 15 (S14). Upon receiving the discovery request signal, the reception unit 32 of the group manager 15 transmits a responding signal (hereinafter also referred to as "discovery response signal") indicating that the node has been discovered to the device 16 (S16).

Upon receiving the discovery response signal, the device 16 transmits the own electronic certificate that has been stored in advance to the group manager 15 (S18). The reception unit 32 of the group manager 15 receives the electronic certificate transmitted from the device 16 and transmits the electronic certificate of the own device (HEMS controller 14) that has been stored in advance to the device 16 (S20). The group manager 15 and the device 16 perform mutual authentication by verifying the electronic certificate transmitted from each other. In the embodiment, by checking whether or not a signer indicated by the electronic certificate of the device 16 is included in the list of highly-reliable signers stored in the signer information storage unit 26, the authentication unit 34 of the group manager 15 determines the reliability of the device 16 (S22).

It is assumed that the reliability of the device 16 is determined to be high, that is, the registration of the device 16 in the HEMS is permitted. The group manager 15 and the device 16 share a communication key by a publicly-known method (S24, S26). Thereby, secure communication between the HEMS controller 14 and the device 16 becomes possible, that is, the device 16 participates in the HEMS network. The group manager 15 returns to the state of waiting for receiving a discovery request signal.

Next, the user moves from the first room to the second room and inputs operation (such as pressing a predetermined button) that triggers the start of authentication to the device 18 (for example, a refrigerator) installed in the second room. The device 16 detects the above user operation (S28) and transmits a discovery request signal to the group manager 15 (S30). The reception unit 32 of the group manager 15 transmits the discovery response signal to the device 18 (S32).

Upon receiving the discovery response signal, the device 18 transmits the own electronic certificate that has been stored in advance to the group manager 15 (S34). The reception unit 32 of the group manager 15 receives the electronic certificate transmitted from the device 18 and transmits the electronic certificate of the own device that has been stored in advance to the device 18 (S36). The group manager 15 and the device 18 perform mutual authentication by verifying the electronic certificate transmitted from each other. By checking whether or not a signer indicated by the electronic certificate of the device 18 is included in the list of highly-reliable signers stored in the signer information storage unit 26, the authentication unit 34 of the group manager 15 determines the reliability of the device 16 (S38).

It is assumed that the reliability of the device 18 is determined to be high, that is, the registration of the device 18 in the HEMS is permitted. The group manager 15 and the device 18 share a communication key by a publicly-known method (S40, S42). Thereby, secure communication between the HEMS controller 14 and the device 18 becomes possible, that is, the device 18 participates in the HEMS network. The group manager 15 returns to the state of waiting for receiving a discovery request signal.

As described above, in the continuous registration mode, the group manager 15 can continuously register a plurality of devices (the device 16, the device 18, etc.) in the HEMS during a predetermined period. A user (for example, a housing contractor or a resident) can register a plurality of devices in the HEMS by inputting an authentication start trigger to each device installed in each room while going around each room in the house.

Figure 5:
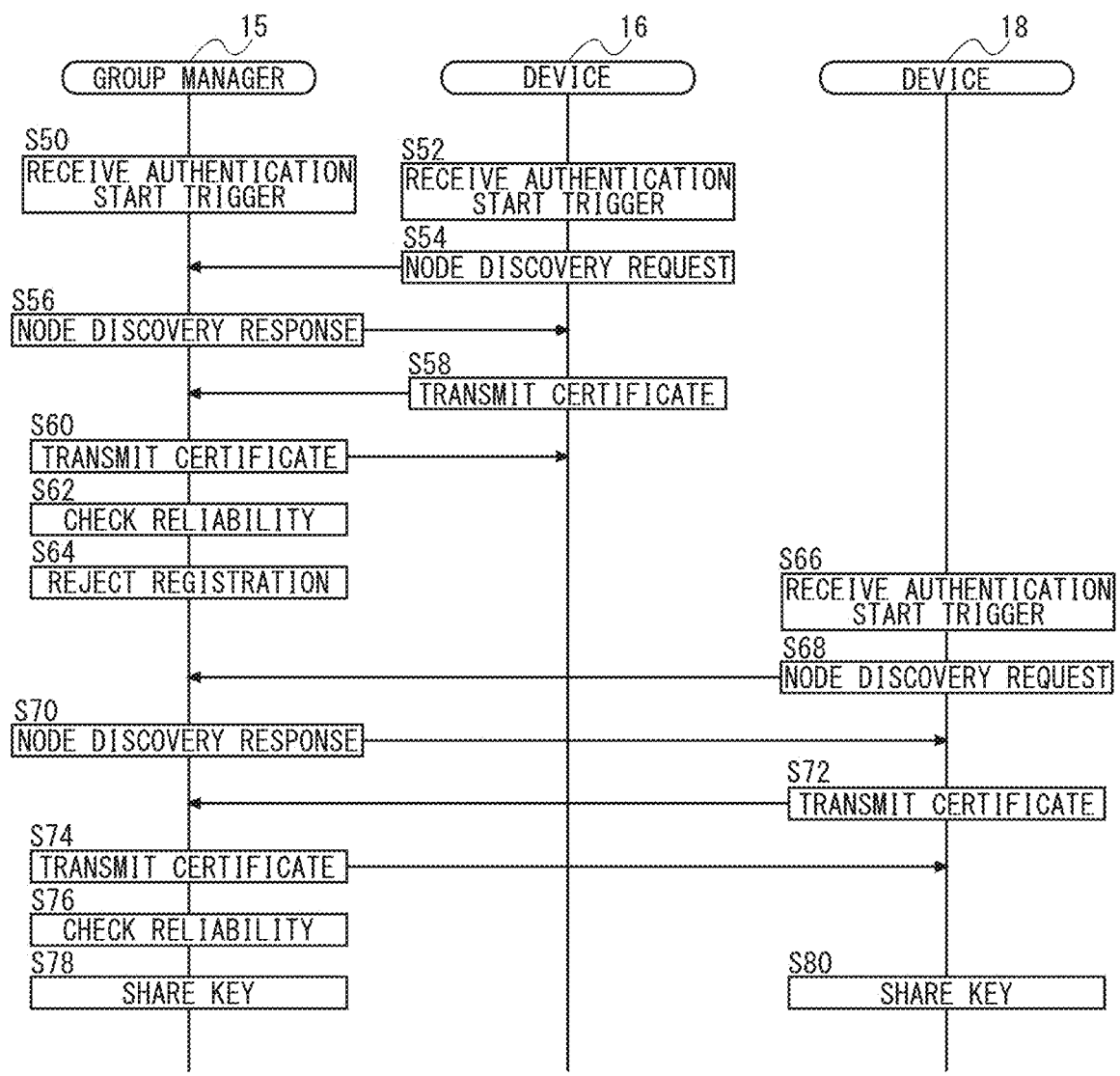
FIG. 5 is a flowchart showing the operation of the communication system according to the first embodiment.

FIG. 5 is also a flowchart showing the operation of the communication system 10 according to the first embodiment. Processes in S50 through S62 of FIG. 5 are the same as the processes in S10 through S22 of FIG. 4. Thus, the explanation thereof will be omitted. In the figure, it is assumed that a signer of the electronic certificate of the device 16 is not included in the list of highly-reliable signers stored in the signer information storage unit 26. The authentication unit 34 of the group manager 15 determines that the reliability of the device 16 is low and refuses to register the device 16 in the HEMS (S64). In this case, a communication key sharing process by the key exchange unit 36 is skipped.

Even when the group manager 15 refuses to register the device 16 in the HEMS, the group manager 15 continues the continuous registration mode and returns to the state of waiting for receiving a discovery request signal. Processes in S66 through S80 of FIG. 5 are the same as the processes in S28 through S42 of FIG. 4. Thus, the explanation thereof will be omitted. That is, if the reliability of the device 18 is determined to be high regardless of whether or not the device 16 is registered in the HEMS in a single occurrence of the continuous registration mode, the device 18 is registered in the HEMS.

According to the HEMS controller 14 (group manager 15) of the first embodiment, an authentication system that allows for safe and continuous registration can be achieved even when registration requests are received from a plurality of devices having different reliability levels in the continuous registration mode. For example, in a single occurrence of the continuous registration mode, a device that uses a certificate issued by a certificate authority with high reliability can be registered in the HEMS while excluding a device that uses a self-signed certificate with low reliability from the HEMS.

Second Embodiment

The configuration of the communication system 10 of the second embodiment is the same as that of the first embodiment. Hereinafter, differences from the first embodiment will be mainly described, and repetitive description of features already described in the first embodiment will be omitted as appropriate.

Figure 6:
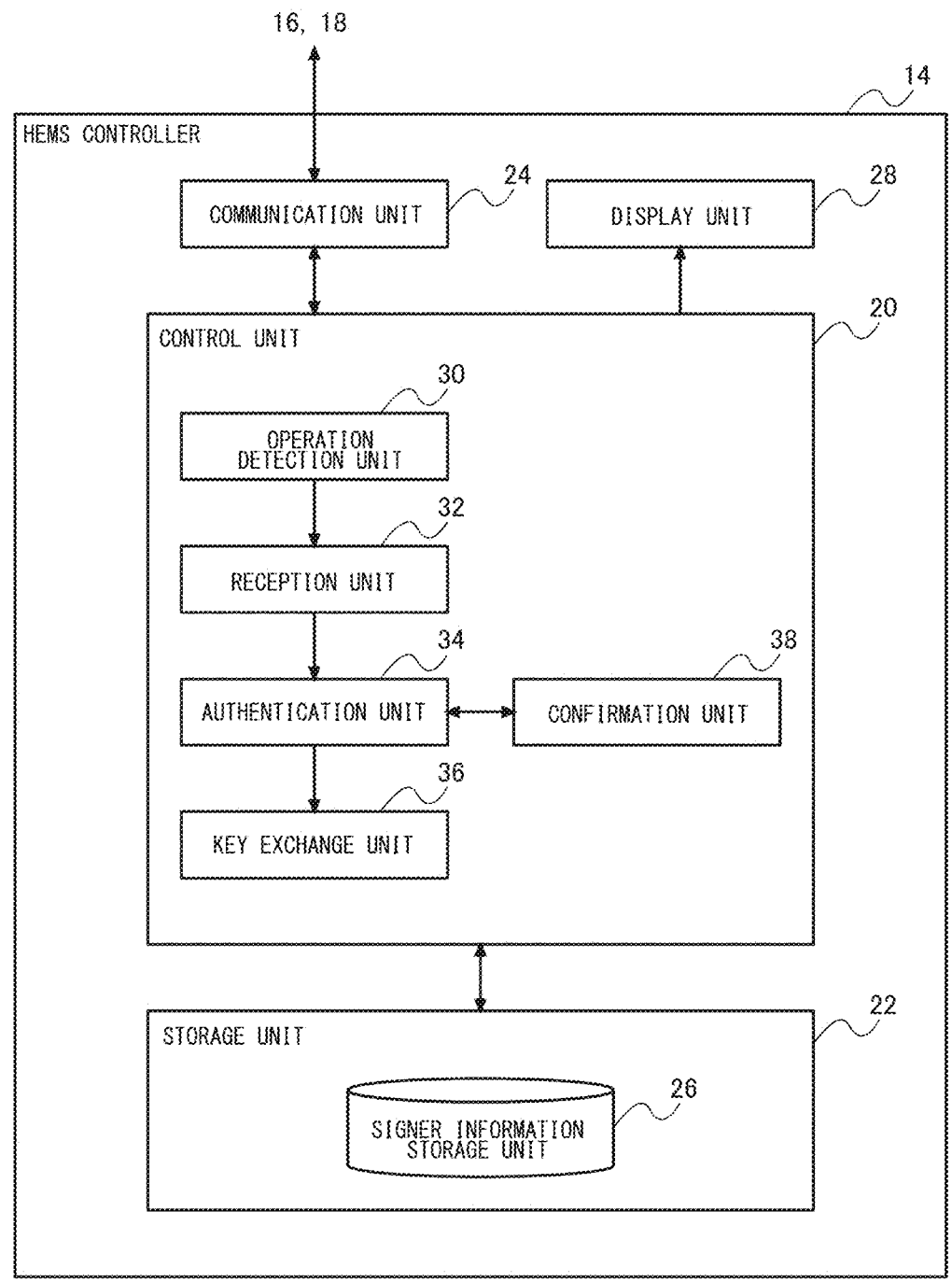
FIG. 6 is a block diagram showing functional blocks of a HEMS controller according to the second embodiment.

FIG. 6 is a block diagram showing functional blocks of the HEMS controller 14 according to the second embodiment. The HEMS controller 14 of the second embodiment further includes a display unit 28 and a confirmation unit 38 in addition to the functional blocks of the first embodiment.

The display unit 28 is, for example, a liquid crystal display provided in the housing of the HEMS controller 14. The display unit 28 may be a touch panel screen having a display function and an operation function. When the authentication unit 34 determines that the reliability of an attribute indicated by the electronic certificate of a certain device is low, the confirmation unit 38 confirms with the user whether or not to permit registration of the device via the display unit 28.

Figure 7:
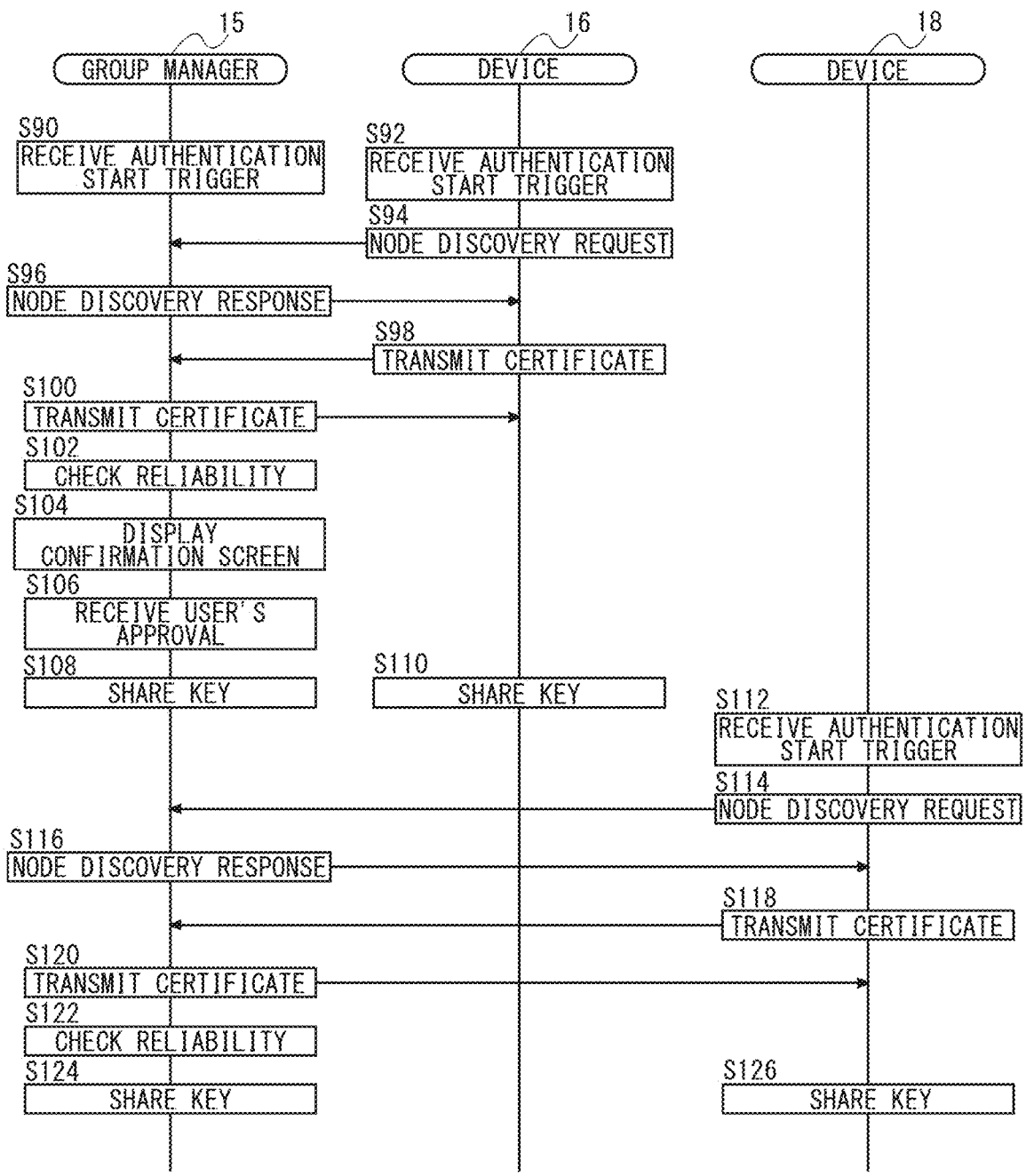
FIG. 7 is a flowchart showing the operation of the communication system according to the second embodiment.

FIG. 7 is a flowchart showing the operation of the communication system 10 according to the second embodiment. Operation shown in the figure corresponds to the operation shown in FIG. 5 and represents operation occurring when the reliability of the device 16 is low and the reliability of the device 18 is high. Processes in S90 through S102 of FIG. 7 are the same as the processes in S10 through S22 of FIG. 4. Thus, the explanation thereof will be omitted.

When the authentication unit 34 determines that the reliability of the device 16 is low, the confirmation unit 38 of the group manager 15 generates data for a confirmation screen for confirming with the user whether the device 16 can be registered or not and displays the confirmation screen on the display unit 28 (S104). The confirmation screen includes a message such as (1) "You are trying to connect to a device with low reliability. Is it OK to connect?" and may include content prompting to input operation indicating approval of the connection (registration in the HEMS) or operation indicating rejection.

Further, the confirmation screen may include (2) as information on a device with low reliability (in other words, a device to be confirmed) attribute information on the electronic certificate of the device (attribute information 52 shown in FIG. 3, for example, the serial number, model number, signer, etc., of the device). Further, the confirmation unit 38 may acquire detailed information, manufacturer information, and the like of the device from an external server (such as the website of the manufacturer of the device) based on information such as an electronic certificate of the device with low reliability. In this case, the confirmation screen may include (3) as information on the device with low reliability, detailed information and manufacturer information of the device acquired from the external server.

The operation detection unit 30 of the group manager 15 receives user operation that is input on the confirmation screen and that indicates approval or rejection of registration of the device 16 in the HEMS. In the example of FIG. 7, the operation detection unit 30 receives user operation indicating approval (S106). In this case, the authentication unit 34 of the group manager 15 permits the registration of the device 16 in the HEMS, and the group manager 15 (key exchange unit 36) and the device 16 share a communication key (S108, S110). On the other hand, when user operation indicating rejection is receives, the authentication unit 34 of the group manager 15 refuses to register the device 16 in the HEMS. In this case, a communication key sharing process by the key exchange unit 36 is skipped.

Processes in S112 through S126 of FIG. 7 are the same as the processes in S28 through S42 of FIG. 4. Thus, the explanation thereof will be omitted. That is, if the reliability of the device 18 is determined to be high regardless of whether or not the device 16 is registered in the HEMS in a single occurrence of the continuous registration mode, the device 18 is registered in the HEMS.

According to the HEMS controller 14 (group manager 15) of the second embodiment, an authentication system that allows for safe and continuous registration can be achieved even when registration requests are received from a plurality of devices having different reliability levels in the continuous registration mode. Further, in the HEMS controller 14 according to the second embodiment, even a device determined to have low reliability based on the electronic certificate is registered in the HEMS as long as the user approves the registration, and the more flexible operation of the HEMS can therefore be realized.

Described above is an explanation of the present disclosure based on the first embodiment and the second embodiment. These embodiments are intended to be illustrative only, and it will be understood by those skilled in the art that various modifications to constituting elements and processes could be developed and that such modifications are also within the scope of the present disclosure.

A first exemplary variation is now described in detail. Upon rejecting the registration of a certain device in the HEMS based on an attribute indicated by the electronic certificate of the device, the authentication unit 34 of the HEMS controller 14 may end the continuous registration mode. For example, when the registration of the device 16 is rejected as shown in S64 of FIG. 5, the authentication unit 34 may end the continuous registration mode that has started being triggered by the authentication start trigger of S50. In this case, the reception unit 32 may reject the reception of a discovery request signal from the device 18 and may suppress the transmission of a discovery response signal. According to this exemplary variation, the continuous registration mode is ended when a device with low reliability exists so that it becomes easy for the user to recognize a device with low reliability, and the security of the HEMS can be further enhanced.

A second exemplary variation will be described. Although not mentioned in the above embodiments, the HEMS controller 14 (group manager 15) may include an individual registration mode in addition to the continuous registration mode as an operation mode for registering devices in the HEMS. The individual registration mode is an operation mode in which only one device can be registered in the HEMS. The confirmation unit 38 of the HEMS controller 14 may display a confirmation screen including content prompting the user to try to register a device (referred to herein as "target device") in the individual registration mode when the authentication unit 34 determines that the reliability of the device is low.

When operation is input indicating that the user has approved trying to register the target device in the individual registration mode, the authentication unit 34 may end the continuous registration mode. Thereafter, the user operates the HEMS controller 14 in the individual registration mode and tries to register the target device. Alternatively, when operation is input indicating that the user has approved trying to register the target device in the individual registration mode, the authentication unit 34 may continue the continuous registration mode while skipping the communication key sharing process so as to end the process of registering the target device. In this case, the user can register another device.

A third exemplary variation will be described. Although not mentioned in the above embodiments, the HEMS controller 14 (group manager 15) may further include a device control unit that refers to and changes the state of a device registered in the HEMS. The function of referring to the state of the device includes a function of acquiring the setting and operation state of the device from the device and notifying the user (user's smartphone or the like). Furthermore, a function of changing the state of a device includes a function (for example, a function of switching on an air conditioner, lighting, or the like) of changing the setting and operation state of the device in accordance with operation input from the user (user's smart phone etc.).

When the authentication unit 34 determines that the reliability of the device (referred to as "target device" here) is low and the user approves the registration of the target device on the confirmation screen, the authentication unit 34 may place a functional restriction on the target device. In other words, the authentication unit 34 may register the target device in the HEMS with a functional restriction. In this case, the device control unit may refuse to change the state of the target device while permitting reference to the state of the target device. For example, when operation instructing to change the state of the target device is input from the user, the device control unit may notify the user that the target device is under a functional restriction because the reliability of the target device is low, that is, notify the user that the state of the target device cannot be changed. When the HEMS controller 14 (for example, the authentication unit 34 or the device control unit) registers the target device in the HEMS with the functional restriction, the HEMS controller 14 may refuse the target device to refer to and/or change the state of the HEMS controller 14.

According to the third exemplary variation, the safety of the HEMS can be further enhanced by restricting the functions of devices with low reliability in the HEMS. Furthermore, even if the device has low reliability, a decrease in user convenience can be suppressed by permitting information reference that is unlikely to impair safety. In the third exemplary variation, with regard to a target device determined to have low reliability, the confirmation unit 38 may display a selection screen for allowing the user to select one of the following: (1) permit registration without functional restrictions (i.e., regular registration); (2) permit registration with a functional restriction(s); and (3) reject registration.

A fourth exemplary variation will be described. Although not mentioned in the above embodiment, the HEMS controller 14 may further include a signer information update unit for receiving a list that has been transmitted from a server managing the HEMS of each household and that indicates one or more signers recognized as having high reliability and storing the list in the signer information storage unit 26. The signer information update unit may update the list that is stored in the signer information storage unit 26 and that indicates one or more signers recognized as having high reliability in accordance with list update information provided from the server. According to this exemplary variation, it is possible to determine whether or not a device can be registered based on the latest information related to a signer recognized to have high reliability.

Optional combinations of the aforementioned embodiments and exemplary variations will also be within the scope of the present disclosure. New embodiments resulting from the combinations have combined effects of the embodiments and exemplary variations that are combined. It will be obvious to those skilled in the art that the function to be achieved by each constituent requirement described in the claims are achieved by each constituting element shown in the embodiments and in the exemplary variations or by a combination of the constituting elements.

The technologies according to the embodiments and exemplary variations may be defined by the following items.
[Item 1] A communication device (14) that manages a predetermined system, including:

a reception unit (32) that receives, from each of a plurality of devices requesting registration in the system, an electronic certificate of the device in a continuous registration mode in which a plurality of devices can be continuously registered in the system; and an authentication unit (34) that determines whether or not to permit registration in the system for each device based on an attribute indicated by the electronic certificate of each of the plurality of devices.
[Item 2] The communication device (14) according to Item 1, wherein upon rejecting the registration of a first device in the system based on an attribute indicated by the electronic certificate of the first device, the authentication unit (34) continues the continuous registration mode and determines whether or not to register a second device different from the first device in the system based on an attribute indicated by the electronic certificate of the second device.
[Item 3] The communication device (14) according to Item 1, wherein upon rejecting the registration of a certain device in the system based on an attribute indicated by the electronic certificate of the device, the authentication unit (34) ends the continuous registration mode.

[Item 4] The communication device (14) according to any one of Items 1 through 3, wherein
the authentication unit (34) determines whether or not to permit registration in the system for each device in accordance with the reliability of a signer indicated by an electronic certificate of each device.

[Item 5] The communication device (14) according to any one of Items 1 through 4, further including
a confirmation unit (38) that confirms, when the authentication unit (34) determines that the reliability of an attribute indicated by the electronic certificate of a certain device is low, with the user whether or not to permit registration of the device.

[Item 6] A communication method executed by a communication device (14) that manages a predetermined system, including:
receiving, from each of a plurality of devices requesting registration in the system, an electronic certificate of the device in a continuous registration mode in which a plurality of devices can be continuously registered in the system; and
determining whether or not to permit registration in the system for each device based on an attribute indicated by the electronic certificate of each of the plurality of devices.

[Item 7] A computer program that causes a communication device (14), adapted to manage a predetermined system, to implement modules of:
receiving, from each of a plurality of devices requesting registration in the system, an electronic certificate of the device in a continuous registration mode in which a plurality of devices can be continuously registered in the system; and
determining whether or not to permit registration in the system for each device based on an attribute indicated by the electronic certificate of each of the plurality of devices.

What is claimed is:

1. A communication device that manages a system, comprising a controller programmed to:
receive a request for registration in the system from a first device, the request including an electronic certificate of the first device; and
determine whether to register the first device in the system based on an attribute indicated by the electronic certificate of the first device;
wherein the controller is programmed to enter a continuous registration mode that is maintained for a period of time, during which the controller is maintained ready to receive requests from a plurality of devices, the plurality of devices including the first device and a second device different from the first device,
wherein in the continuous registration mode, the controller processes a request from the first device and then processes a request from the second device, when the request from the first device is received before the request from the second device is received, and
wherein in the continuous registration mode, even after rejecting the registration of the first device in the system based on the attribute indicated by the electronic certificate of the first device, the controller continues the continuous registration mode when the period of time has not passed, and determines whether to register the second device in the system based on an attribute indicated by an electronic certificate of the second device.

2. The communication device according to claim 1, wherein
upon rejecting the registration of a certain device in the system based on an attribute indicated by the electronic certificate of the certain device, the controller ends the continuous registration mode.

3. The communication device according to claim 1, wherein
the controller determines whether or not to permit registration in the system for each device in accordance with reliability of a signer indicated by an electronic certificate of each device.

4. The communication device according to claim 1, wherein the controller is further programmed to confirm, when determining that reliability of an attribute indicated by the electronic certificate of a certain device is low, with a user whether or not to permit registration of the certain device.

5. The communication device according to claim 1, wherein the controller is programmed to enter the continuous registration mode in response to instructions from a user.

6. A communication method executed by a communication device that manages a system, comprising:
receiving a request for registration in the system from a first device, the request including an electronic certificate of the first device; and
determining whether to register the first device in the system based on an attribute indicated by the electronic certificate of the first device;
entering a continuous registration mode that is maintained for a period of time, during which the communication device is maintained ready to receive requests from a plurality of devices, the plurality of devices including the first device and a second device different from the first device,
in the continuous registration mode, processing a request from the first device and then processing a request from the second device, when the request from the first device is received before the request from the second device is received, and
in the continuous registration mode, even after the registration of the first device in the system is rejected based on the attribute indicated by the electronic certificate of the first device, continuing the continuous registration mode when the period of time has not passed, and determining whether to register the second device in the system based on an attribute indicated by an electronic certificate of the second device.

7. The communication method according to claim 6, wherein further comprising receiving instructions from a user to enter the continuous registration mode.

8. A non-transitory computer-readable recording medium storing a computer program that causes a communication device, adapted to manage a system, to:
receive a request for registration in the system from a first device, the request including an electronic certificate of the first device; and
determine whether to register the first device in the system based on an attribute indicated by the electronic certificate of the first device;
enter a continuous registration mode that is maintained for a period of time, during which the communication device is maintained ready to receive requests from a plurality of devices, the plurality of devices including the first device and a second device different from the first device,
in the continuous registration mode, process a request from the first device and then processing a request from the second device, when the request from the first device is received before the request from the second device is received, and in the continuous registration mode, even after the registration of the first device in the system is rejected based on the attribute indicated by the electronic certificate of the first device, continue the continuous registration mode when the period of time has not passed, and determine whether to register the second device in the system based on an attribute indicated by an electronic certificate of the second device.

9. The non-transitory computer-readable recording medium according to claim 8, wherein the computer program causes the communication device to receive instructions from a user to enter the continuous registration mode.

\* \* \* \* \*